United States Patent [19]

Melley et al.

[11] 4,127,300
[45] Nov. 28, 1978

[54] TRANSITION PIECE FOR POWER PLANT IN MOBILE ELECTRIC POWER GENERATING SYSTEMS

[75] Inventors: Joseph F. Melley, Davie; Richard K. Fischer, Bradenton, both of Fla.

[73] Assignee: Melley Energy Systems, Inc., Pompano Beach, Fla.

[21] Appl. No.: 765,671

[22] Filed: Feb. 4, 1977

[51] Int. Cl.² .............................................. B62D 1/20
[52] U.S. Cl. .............................. 296/28 R; 296/35 R; 180/64 R
[58] Field of Search ............... 296/28 R, 35 R, 35 A; 322/1; 280/179 R; 180/64 R, 64 M; 248/3

[56] References Cited

U.S. PATENT DOCUMENTS

| | | | |
|---|---|---|---|
| 2,117,034 | 5/1938 | Oesterlein | 322/1 |
| 3,317,236 | 5/1967 | Connerat | 280/179 |
| 3,353,771 | 11/1967 | Bow | 180/64 R |
| 3,910,624 | 10/1975 | Becker | 296/35 R |

*Primary Examiner*—Philip Goodman
*Attorney, Agent, or Firm*—Jerold A. Jacover; William A. Webb

[57] ABSTRACT

In a mobile electric power generating system, means for mounting a power plant to a trailer bed are disclosed. Such means include a transition piece having a top flange adapted to be mounted to the power plant, a bottom flange, and intermediate plate means disposed between the top and bottom flanges. The intermediate plate means are arranged to absorb some of the twisting forces necessarily associated with the movement of the trailer bed. Means are further provided to secure the bottom flange of the transition piece to a main rail of the trailer bed without imparing the integrity of the main rail.

4 Claims, 4 Drawing Figures

TRANSITION PIECE FOR POWER PLANT IN MOBILE ELECTRIC POWER GENERATING SYSTEMS

BACKGROUND OF THE INVENTION

This invention relates to mobile electric power generating systems in general and to improvements in mobile electric power generating systems of the type comprising an enclosed trailer which may have a length of about 40 feet for carrying a prodigious power plant having generating capacities ranging from about 100 kilowatts up to and exceeding 1000 kilowatts. More particularly, this invention relates to an improved interface or transition piece for securing the power plant to the trailer bed.

Trailer-mounted electric power generating equipment of the type described is designed as an independent, self-contained, source of electricity. The trailer is typically towed to a remote site, often in tropical or desert areas, where electric power is needed but unavailable through more conventional means. During transport, a 40-foot trailer typically undergoes twisting forces or torques about its longitudinal axis which may cause deflections on the order of about 18 inches. Such deflections could cause fractures or cracks in power plants of the type described, particularly in situations where portions of the power plants are cast formed.

It is therefore a primary object of this invention to provide means for securing such power plants to a trailer bed in a manner which minimizes the likelihood of damage during transport. It is another object of this invention to secure the power plant to the trailer bed with minimal damage to the structural integrity of the trailer bed or the trailer itself. Other objects, features and advantages of the invention will become apparent hereinafter.

SUMMARY OF THE INVENTION

In accordance with the foregoing objects, this invention pertains to a mobile electric power generating system comprising a power plant and a trailer bed, including at least one main rail having a horizontal top plate. A transition piece has a top flange adapted to be fastened to the base of the power plant, and an elongated bottom flange adapted to be secured to the horizontal top plate of the main rail. The transition piece is arranged to absorb at least some of the twisting forces applied to the trailer, thereby protecting the power plant from cracking or fracturing during transport. In addition, the transition piece may be attached to the trailer bed without drilling holes in the main rails, thereby minimizing structural damage thereto.

DESCRIPTION OF THE DRAWINGS

Though the novel aspects and features of the electric power generating system summarized above are defined in the appended claims, the invention itself, together with further objects and attendant advantages, will be best understood by reference to the following detailed description taken in connection with the accompanying drawings, in which:

DETAILED DESCRIPTION OF AN EXEMPLARY EMBODIMENT

Figure 1:
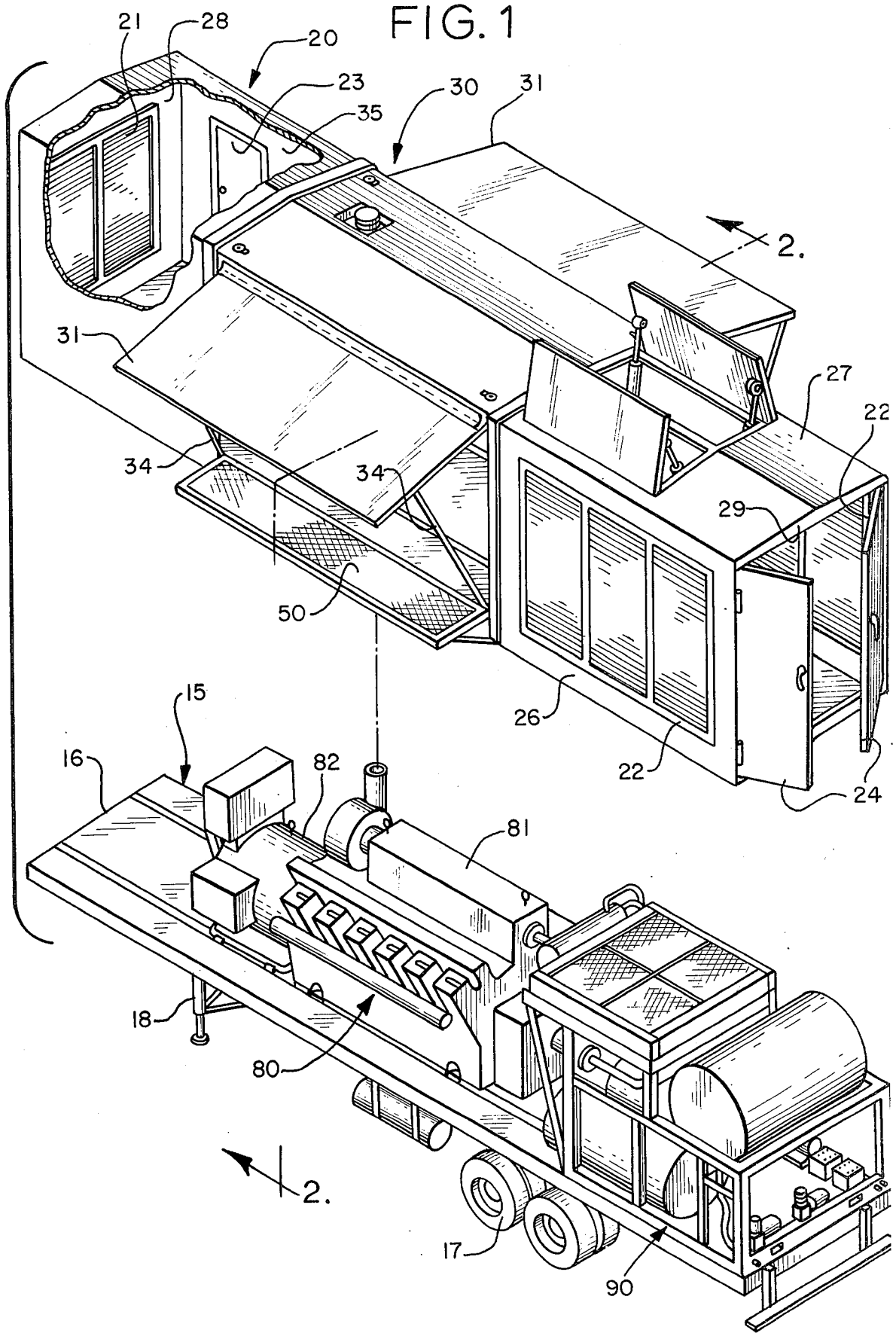
FIG. 1 is an exploded view, taken in perspective, of the electric power generating system incorporating the invention.
Figure 2:
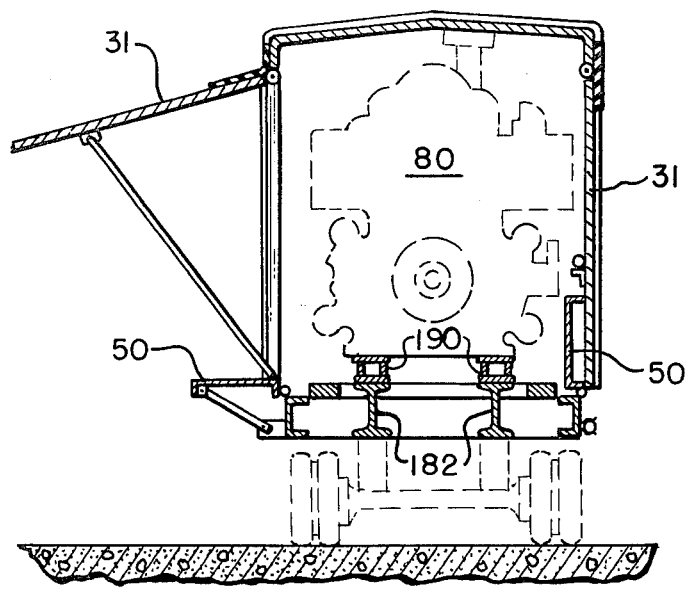
FIG. 2 is a plan view of the rear of the system illustrated in FIG. 1.

Referring to FIGS. 1 and 2, one preferred embodiment of the mobile electric power generating system incorporating the invention is illustrated. This embodiment has five major components: a trailer 15, a trailer enclosure 20, a removable section 30 of trailer enclosure 30, a power plant 80, and a utility frame 90. Some of these components will be described in greater detail below. Initially, however, it should be understood that the components 20, 30, 80 and 90 are mounted directly or indirectly to trailer 15 is form a self-contained mobile electric power generating system.

In general, trailer 15 includes a substantially flat bed 16, and a conventional tandem axle, eight-tire wheel structure 17. Trailer 15 is arranged to be hitched to, and towed, by a tractor (not shown) in a manner well known in the art. Conventional supports 18 are secured to the underside of bed 16, and are arranged to help support the forward portion of trailer 15 when the tractor is not hitched thereto.

With the exception of special computer brakes, trailer 15 generally conforms to all of the regulations promulgated by the U.S. Department of Transportation. Thus, in one preferred embodiment, trailer 15 is approximately 40 feet long and eight feet wide, and with enclosure 20 attached, is approximately 12 feet, 7 inches in height. Further details of trailer 15, particularly the main frame of bed frame 16, are discussed hereinafter in connection with FIGS. 7 and 8.

In this embodiment, enclosure 20 of trailer 15 is a hollow, five-sided shell comprising a pair of side walls 25, 26, a top wall 27, a front wall 28 and a rear wall 29. Disposed in rear wall 29 are a pair of rear doors 24 which, when opened, provide an access to trailer bed 16 substantially equal in area to the cross-sectional area of enclosure 20. The rearward portions of both side walls 25 and 26 define louvered portions 22. Louvers 21, of similar construction to louvered portions 21, are defined in front wall 28. A utility door 23, primarily used to provide access to personnel, is located near the forward end of side wall 26.

In this embodiment, the removable section 30 of enclosure 20 is located substantially at the center thereof. Removable section 30 includes two canopies 31, and two platforms 50. Canopies 31 may be opened to provide access to trailer bed 16 from outside trailer 15, and platforms 50 may be lowered after canopies 31 are opened, to form a work area adjacent to power plant 80. Removable section 30 which forms an integral part of the enclosure 20 when mounted on trailer bed 16, may be lifted off of trailer 15 as a unit, permitting free access to the equipment therein, particularly the top and sides of power plant 80.

Power plant 80 typically includes an electric power generator 82, and an engine 81 for turning generator 82. Power plant 80 may also include a control panel 83 for monitoring and operating both engine 81 and generator 82. In one preferred embodiment, engine 81 is a V-12 turbocharged diesel manufactured by Waukesha Engine Division of Dresser Industries and identified as Waukesha model number L5792DSIU. The generator 82, to which this engine is preferably connected, is a 600

KW electrical generator manufactured by Kato Engineering Co.

At least many of the support systems for power plant 80 are carried by a utility frame 90. These support systems may include various fuel and air tanks, motors, heat dissipation means and other apparatus which are all described in greater detail hereinafter. The use of utility frame 90 for mounting the support systems for power plant 80 permits the systems to be installed within enclosure 20 as a single unit. This, of course, eliminates the need for separately installing all of the various tanks, motors, and other apparatus, thereby minimizing the time and costs of assembly, and providing maximum economies of space.

The embodiment shown in FIG. 1 has a gross weight of approximately 57,000 pounds, and is capable of reliably generating about 600 kilowatts of electrical power. Nonetheless, it can be expeditiously assembled, transported, operated and maintained. For a more detailed description of the separate components comprising the system, reference should be made to a co-pending application, Ser. No. 759,211, filed on Jan. 13, 1977, and assigned to the same assignee.

Figure 4:
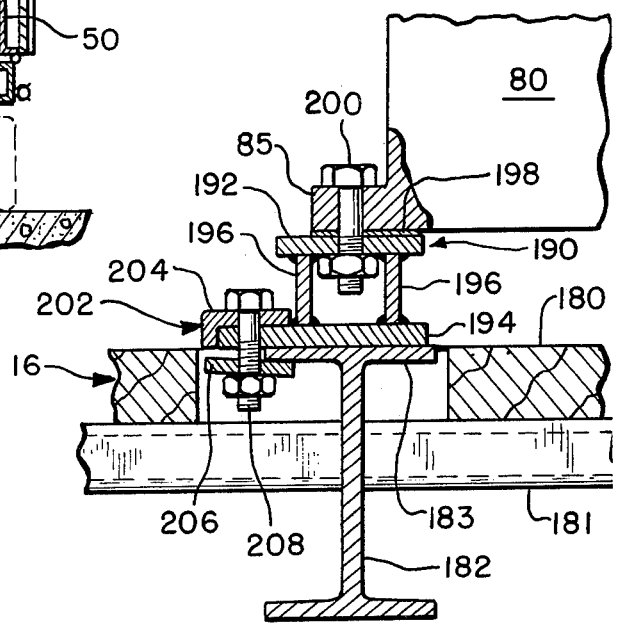
FIG. 4 is a sectional view taken along lines 3—3 of FIG. 3.
Figure 3:
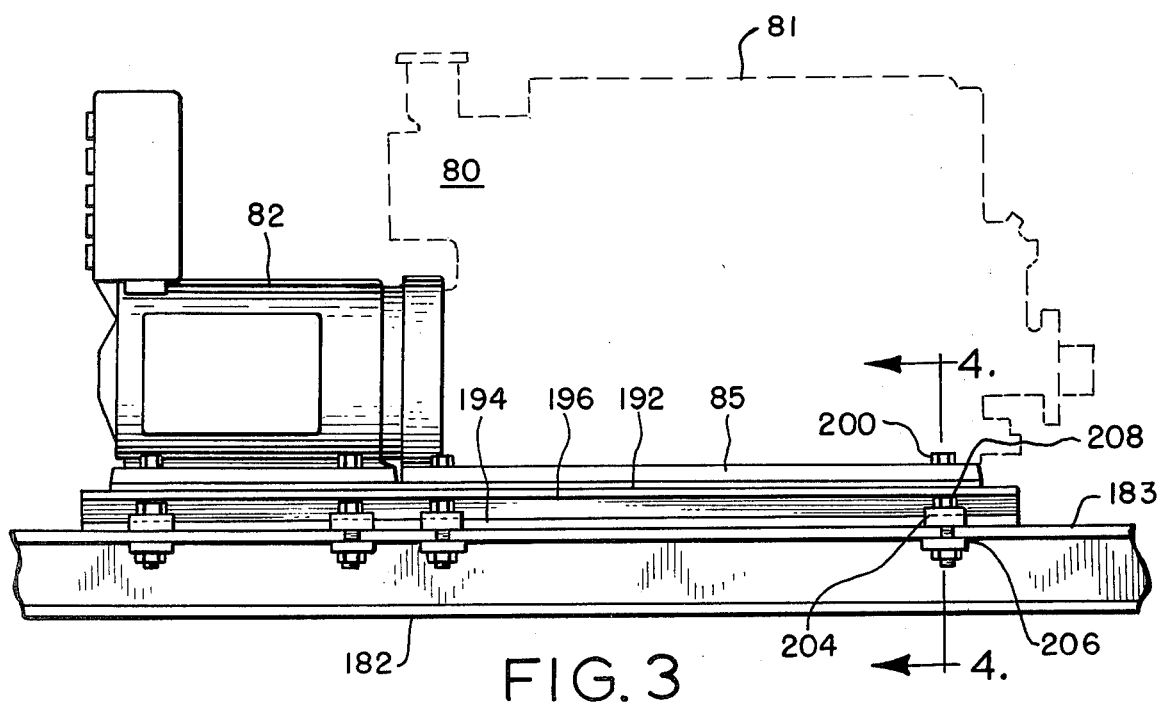
FIG. 3 is a plan view of a portion of the system illustrated in FIG. 1.

Turning now to FIGS. 3 and 4, the apparatus for securing power plant 80, including engine 81 and generator 82, to trailer bed 16 is shown. Both engine 81 and generator 82 are mounted on a pair of transition pieces 190 which are in turn clamped to a pair of main frame members 182. As shown in FIG. 1, frame members 182 are parallel I-beams which extend substantially the entire length of trailer bed 16. Frame members 182 have an upper flange 183 which, along with a floor sill structure 181, serves to support the floor 180 of trailer bed 16.

Each transition piece 190, which is mounted between the base of power plant 80 and each of main frame members 182, is an elongated structure comprising a top plate 192, two intermediate side plates 196, and a bottom plate 194 preferably of somewhat greater width than that of top plate 192. In this exemplary embodiment, the four plates comprising each transition piece 190 are welded together to form a single unit. Intermediate side plates 196 are preferably parallel to one another, and are of such length and thickness as to absorb at least some of the twisting forces necessarily associated with the movement of a 40-foot trailer such as trailer 15.

Engine 81 and generator 82 have at their base a number of mounting flanges 85 which are secured to top plate 192 of transition piece 190 with bolts 200, or other suitable fasteners. Shims 198 are placed between top plate 192 and the bottom of mounting flanges 85 in order to properly align the engine and the generator on the transition piece.

A clamp 202 serves to secure each transition piece 190 to each main frame member 182. Clamp 202 preferably comprises a right angle top section 204 and a separate bottom section 206 which are sandwiched around bottom plate 194 of transition piece 190 and top plate 183 of main frame member 182. A bolt 208 pinches top section 204 and bottom section 206, thereby securing transition piece 190 to main frame member 182. Use of clamp 202 to secure transition piece 190 to main frame member 182 eliminates the need to drill holes in top plate 183 of frame member 182. Such holes would, of course, undesirably weaken main frame members 182, and hence the entire trailer bed.

Power plant 80 is preferably assembled by first securing engine 81 to transition piece 190 with bolts 200. Generator 82 may then be connected to engine 81 and secured to transition piece 190 by additional bolts 200. Power plant 80, which now can be handled as a unit, is then lowered onto trailer bed 16, preferably through the access provided by the removal of removable section 30 of enclosure 20. When so lowered, each of transition pieces 190 are aligned with main frame members 182 and secured thereto with clamps 202 is the manner described. After power plant 80 has been mounted on trailer bed 16, removable section 30 is replaced and secured to enclosure 20.

In view of the foregoing, it should be clear that transition pieces 190 permit power plant 80 to be handled as a single unit. Further, through the use of clamps 202, transition pieces 190 permit power plant 80 to be mounted on trailer bed 16 without impairing the integrity of main frame members 182 such as by drilling holes therein. In addition, transition pieces 192 provide a small degree of "play" in the mounted power plant which absorbs longitudinal twisting forces or torques that are necessarily associated with a 40-foot trailer. Since portions of the power plant are frequently casted, and are therefore relatively brittle, such torques could undesirably fracture the power plant in the absence of means for providing such "play."

Though the exemplary embodiment herein disclosed is preferred, various modifications and refinements which do not part from the true scope of the invention will be apparent to those skilled in the art. Accordingly, all such modifications and refinements are intended to be covered by the appended claims.

We claim:

1. In a mobile electric power generating system comprising a power plant and a trailer bed subject to twisting forces during movement thereof, said trailer bed including at least one main rail having a horizontal top plate, means for mounting said power plant to said trailer comprising:
   a transition piece having a top flange adapted to be fastened to the base of said power plant, a bottom flange, and intermediate plate means disposed between said top flange and said bottom flanged arranged to absorb at least some of said twisting forces; and
   clamp means, including a top section having a first portion disposed above said bottom flange; a separate bottom section disposed below said top plate; and means for urging said first portion of said top section and said bottom section toward each other without impairing the integrity of said main rail to secure said transition piece thereto.

2. In a mobile electric power generating system comprising a power plant and a trailer bed subject to twisting forces during movement thereof, said trailer bed including at least one main rail having a horizontal top plate, means for mounting said power plant to said trailer comprising:
   a transition piece having a top flange adapted to be fastened to the base of said power plant, a bottom flange, and intermediate plate means disposed between said top flange and said bottom flange arranged to absorb at least some of said twisting forces; and
   clamp means including an angle section having a first portion above said bottom flange extending substantially parallel thereto and a second portion extending downwardly from said first portion; a separate bottom section disposed below said top plate; and bolt means passing through said first portion and said bottom section for urging said angle section and said bottom section toward each other without impairing the integrity of said main rail to secure said transition piece thereto.

3. The mobile electric power generating system defined in claim 2 further includes shim means disposed between the base of said power plant and said top flange of said transition piece.

4. The mobile electric power generating system defined in claim 2 wherein said bottom flange has an elongated width exceeding the width of said top flange.

* * * * *